United States Patent
Matsuhira et al.

(10) Patent No.: US 7,548,219 B2
(45) Date of Patent: Jun. 16, 2009

(54) DISPLAY DEVICE

(75) Inventors: Tsutomu Matsuhira, Chiba (JP); Hiroki Hanawa, Chiba (JP)

(73) Assignee: Seiko Instruments Inc. (JP)

( * ) Notice: Subject to any disclaimer, the term of this patent is extended or adjusted under 35 U.S.C. 154(b) by 575 days.

(21) Appl. No.: 10/949,953

(22) Filed: Sep. 24, 2004

(65) Prior Publication Data

US 2005/0088364 A1 Apr. 28, 2005

(51) Int. Cl.
*G09G 5/00* (2006.01)

(52) U.S. Cl. .................. 345/1.1; 345/1.2; 345/3.1; 345/3.3; 345/30; 345/204; 349/139; 349/149; 349/150; 349/152

(58) Field of Classification Search .............. 345/1.1, 345/1.2, 1.3, 94, 87, 204
See application file for complete search history.

(56) References Cited

U.S. PATENT DOCUMENTS 6,954,184 B2 * 10/2005 Kurashima et al. ........... 345/1.3
7,167,141 B2 * 1/2007 Goto et al. .................... 345/1.1
2004/0140947 A1 * 7/2004 Tsuyuki et al. ............... 345/1.1

* cited by examiner

Primary Examiner—Richard Hjerpe
Assistant Examiner—Jennifer T Nguyen
(74) Attorney, Agent, or Firm—Adams & Wilks

(57) ABSTRACT

A display device has a first color display panel having multi-color pixels formed of two groups of electrodes corresponding to signal electrodes and scanning electrodes. A second display panel has single-color pixels formed of two groups of electrodes corresponding to signal electrodes and scanning electrodes. The number of the signal electrodes of the second display panel are fewer in number than the signal electrodes of the first color display panel. A driver integrated circuit outputs driving signals shared commonly by and supplied to the signal and scanning electrodes of the first and second display panels. The driving signals output from the driver integrated circuit are supplied to the signal electrodes of the second display panel in only one color from among the colors of the multi-color pixels of the first display panel.

4 Claims, 2 Drawing Sheets

DISPLAY DEVICE

BACKGROUND OF THE INVENTION

1. Field of the Invention

The present invention relates to a display device in which display panels, such as passive matrix liquid crystal panels, active matrix liquid crystal panels, or organic EL panels used in an electronic notepad or in portable equipment such as a cellular telephone, are provided on both sides of the display device. More specifically, the present invention relates to an IC wiring structure for driving panels on both sides of the display device.

2. Description of the Related Art

In the conventional display devices, for example, STN liquid crystal display devices, a dot matrix is configured by disposing segment electrodes and common electrodes in a matrix shape. An orienting film of a material such as polyimide is formed on a surface of each electrode, and a liquid crystal layer is provided between the electrode surface and the orienting film. A screen is driven by applying voltage to each of the electrodes in a time division manner. An output electrode of a driver IC is connected to each segment electrode and to each common electrode, and the driver IC driver applies signals to each of the electrodes. Segment signals and common signals applied to each of the electrodes differ. The driver IC that outputs the segment signals and the common signals is configured by one chip when the number of pixels is on the order of 160×128 dots. On the other hand, specific drivers are used respectively as the driver ICs for the segment signals and the common signals when the number of pixels is, equal to or higher than 160×128 dots. The driver IC may be also used in plural, depending upon a relationship between the number of driver signals output by the driver ICs and the number of pixels. Shell type structures that open into two parts have been widely employed in cellular telephones in recent years. Cellular telephones having increased their market shares have such a form that a main screen and a rear surface sub-screen are installed as display screens so that the two screens are displayed on both sides (hereinafter called a double-sided panel). The two screens include separate display panels (refer to JP 2000-338483 A, for example). ICs for driving the display panels are mounted to each of the display panels to thereby drive both screens. Alternatively, one driver IC that corresponds to the combined number of pixels of both display screens is used to drive both screens. In the latter case, when STN liquid crystals are used, for example, the segment signals are extracted from a side that is opposite to a side connected to the main display panel. The segment signals are then input to the sub-display panel by a film substrate and commonly used. Further, the common electrodes for the main display are disposed on both sides of connection terminals for the segment signals. Further, common electrodes for the sub-display are disposed on both sides of the common electrodes for the main display. The common signals used only for the sub-display are input to the common electrodes for the sub-display on the main display panel. The signals used only for the sub-display are input to the sub-display panel via an outer circumferential of the main display panel, similarly to the segment signals, to thereby drive both screens.

Alternatively, with a method of branching off the signals output from the ICs at terminals connected to the main panel and supplying the signals to the sub-panel by using a flexible substrate, for example, the common signals can also be commonly used, in addition to the segment signals.

Problems like those described below, however, exist with the conventional panels.

(1) The number of pixels differs between the main panel and the sub-panel, so that only a portion of the main panel can be displayed in the double-sided sub-panel.

(2) In a case where the main panel is a color display and the sub-panel is a monochrome display, when the segment signals of the main panel are supplied to the sub-panel as is, it is difficult to handle data for displaying characters and pictures because R, G, and B segment signals correspond to one pixel in the main panel.

SUMMARY OF THE INVENTION

An object of the present invention is to provide a method of connecting wirings that can handle a display screen of a main panel and a sub-panel. In order to solve the above-mentioned structure of the conventional structures, the present invention provides a display device for performing display by supplying signals input to a main display panel to sub display panel every several lines. That is, driver signals output by a driver IC are supplied to a main panel, and some of the driver signals are extracted, thinned out according to a ratio of the number of pixels of the sub-panel to the number of pixels of the main panel, and input to the sub-panel. Furthermore, only blue signals of the main panel are input to the sub-panel when the main panel is a color panel and the sub-panel is a monochrome panel.

That is, a display device of the present invention includes a first display panel and a second display panel and a driver IC. The first display panel has pixels constituted by signal electrodes and scanning electrodes. The second display panel has fewer pixels than the first display panel. That is, at least one of the signal electrodes of the second display panel and the scanning electrodes of the second display panel is less than that of the first display panel. The driver IC output segment signals and common signals commonly used for the first display panel and the second display panel.

In the display device, for the electrodes fewer in the second display panel than in the first display panel, the electrodes of the first display panel are thinned out and connected to the electrodes of the second display panel.

Further, when the first display panel is a color display panel having color pixels in a plurality of colors, and the second display panel is a display panel having single-color pixels, driver signals to be supplied to the signal electrodes of the second display panel are supplied to the signal electrode in any one color among from the signal electrodes in the plurality of colors that constitute the color pixels of the first display panel.

DETAILED DESCRIPTION OF THE PREFERRED EMBODIMENTS

A display device according to the present invention includes a first display panel, a second display panel having fewer electrodes than at least one of signal electrodes and scanning electrodes that constitute pixels of the first display panel, and a driver IC that outputs driver signals commonly used by the first display panel and the second display panel. For the electrode type, either the signal electrodes or the scanning electrodes, that is fewer in number in the second display panel than in the first display panel, the same type of electrodes of the first display panel are thinned out and connected to the same type of electrodes of the second display panel. When the main panel and the sub-panel are both color panels, the electrodes connected to the main panel are thinned out and connected to the sub-panel at a ratio between the number of dots of the main panel and the number of dots of the sub-panel. Further, when the sub-panel is a monochrome panel, any one of R, G, and B electrodes connected to the main panel are thinned out and connected to the sub-panel at a ratio between the number of pixels of the main panel and the number of pixels of the sub-panel.

Images of the main panel can thus be reduced in size and displayed in the sub-panel as is, according to this type of configuration. Accordingly, it becomes possible to display images picked up by a camera incorporated in a cellular telephone and the like simultaneously in both the main panel and the sub-panel. Further, information such as characters can be displayed even when the sub-panel is a monochrome panel by corresponding to one color of the color main panel, thereby resulting in improved usability of the display screen.

Embodiment 1

Embodiments of the present invention are explained below based on the drawings.

Figure 1:
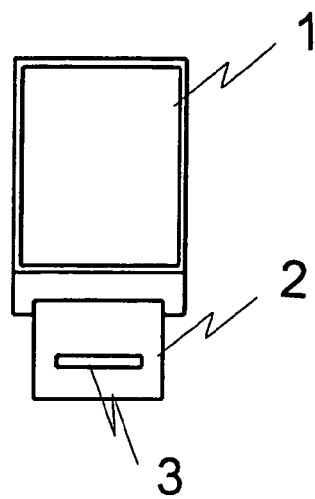
FIG. 1 is an upper surface view in which a first FPC is connected to a main panel.
Figure 2:
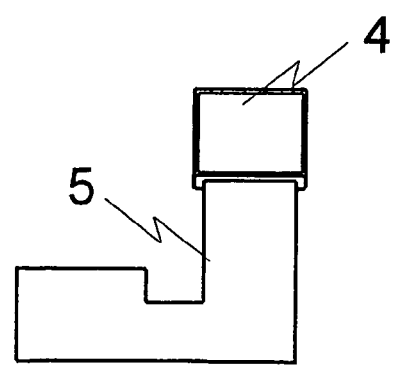
FIG. 2 is an upper surface view in which a second FPC is connected to a sub-panel.
Figure 3:
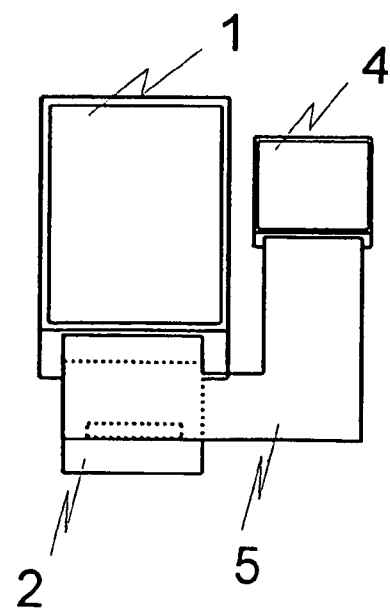
FIG. 3 is an upper surface view in which a sub-panel is connected to a main panel.
Figure 4:
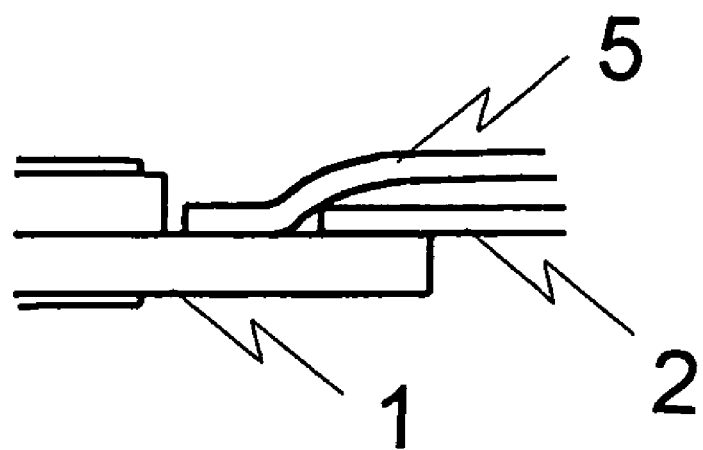
FIG. 4 is a side surface view that shows a connection with an FPC of a terminal portion of a main panel.

FIG. 1 is an upper surface diagram of a partially finished product in which a first FPC 2 on which a driver IC 3 is mounted is connected to a main panel 1, which includes red, green, and blue (hereinafter called RGB) color filters and uses transparent electrodes to obtain pixels in a matrix shape. FIG. 2 is an upper surface diagram of a partially finished product in which a second FPC 5 is similarly connected to a sub-panel 4, which includes RGB color filters and uses transparent electrodes to obtain pixels in a matrix shape. FIG. 3 is an upper surface diagram of a state in which terminals of the second FPC 5 are mounted to terminals of the main panel 1 and wiring connections are complete. FIG. 4 is a cross sectional view showing a state where the second FPC 5 is connected to the main panel transparent electrodes which connect the first FPC 2 to the main panel 1. The main panel 1 is configured by 160 dots vertically and 128 dots horizontally, with the RGB color filters arranged thereupon, and has 160 common electrodes, and 384 (128×3) segment electrodes. The sub-panel 4 is configured by 80 dots vertically and 64 dots horizontally, with the RGB color filters arranged thereupon. There are 80 common electrodes, and 192 (64×3) segment electrodes. The driver IC 3 outputs common and segment signals in order to drive the main panel 1. The FPC 5 is connected to the transparent electrodes of the main panel 1 at a position adjacent to a connection portion where the electrodes of the FPC 2 are connected to the transparent electrodes of the main panel 1. The common electrodes in even number lines or odd number lines connected to the transparent electrode of the main panel are connected to the sub-panel. With RGB taken as one set, the segment electrodes connect to the sub-panel every other set.

In such a connected state between the main panel and the sub-panel, images displayed in the main panel can be reduced in size and displayed in the sub-panel. In particular, pictures such as photographic images can be displayed simultaneously in the main panel and the sub-panel. Attaching a backlight and a plastic frame to the half-finished product shown in FIG. 3 completes a display module.

Embodiment 2

This embodiment differs from Embodiment 1 above in that the sub-panel is not a color panel. A repetitive description as to the same components as those in Embodiment 1 is omitted here. The sub-panel 4 is configured by 80 dots vertically and 64 dots horizontally, with 80 common electrodes and 64 segment electrodes. The driver IC 3 outputs common and segment signals in order to drive the main panel 1. The FPC 5 is connected to the transparent electrodes of the main panel 1 at a position adjacent to a connection portion where the electrodes of the FPC 2 are connected to the transparent electrodes of the main panel 1. The first to eightieth common electrodes connected to the transparent electrodes of the main panel 1 are connected to the sub-panel. Among the segment electrodes, those connected to B of the main panel 1 are connected; the thirty-third to ninety-sixth segment electrodes in B are connected to the sub-panel.

Regarding image display in such a connected state between the main panel and the sub-panel, it is possible to display characters and pictures as an image displayed on the main panel. However, not all of the images will be displayed in this manner, because an image to be displayed using the B (blue) signals is only displayed on the sub-panel.

What is claimed is:

1. A display device, comprising:
   a first display panel having pixels formed of two groups of electrodes corresponding to signal electrodes and scanning electrodes;
   a second display panel having pixels formed of two groups of electrodes corresponding to signal electrodes and scanning electrodes; and
   a driver integrated circuit that outputs driving signals shared commonly by and supplied to the signal and scanning electrodes of the first and second display panels;
   wherein the first display panel is a color display panel and the pixels of the first display panel comprise multi-color pixels;
   wherein the pixels of the second display panel comprise single-color pixels;
   wherein the number of the signal electrodes of the second display panel are fewer in number than the signal electrodes of the first display panel; and
   wherein the driving signals output from the driver integrated circuit are supplied to the signal electrodes of the second display panel in only one color from among the colors of the multi-color pixels of the first display panel.

2. A display device comprising:
   a first display panel having pixels formed of two groups of electrodes corresponding to signal electrodes and scanning electrodes;
   a second display panel having pixels formed of two groups of electrodes corresponding to signal electrodes and scanning electrodes;
   a first flexible substrate connected to the first display panel;
   a second flexible substrate connected to the second display panel and to the first flexible substrate; and
   a driver integrated circuit that outputs driving signals shared commonly by and supplied to the signal and scanning electrodes of the first and second display panels;

wherein the first display panel is a color display panel and the pixels of the first display panel comprise multi-color pixels;

wherein the pixels of the second display panel comprise single-color pixels;

wherein the number of the signal electrodes of the second display panel are fewer in number than the signal electrodes of the first display panel; and wherein the driving signals output from the driver integrated circuit are supplied to the signal electrodes of the second display panel in only one color from among the colors of the multi-color pixels of the first display panel.

3. A display device, comprising:

a first display panel having pixels formed of two groups of electrodes corresponding to signal electrodes and scanning electrodes;

a second display panel having pixels formed of two groups of electrodes corresponding to signal electrodes and scanning electrodes, the electrodes in at least one of the two groups of electrodes of the second display panel being connected to some but not all of respective ones of the electrodes in the corresponding group of electrodes of the first display panel; and a driver integrated circuit that outputs driving signals shared commonly by and supplied to the signal and scanning electrodes of the first and second display panels;

wherein the pixels of the first display panel comprise multi-color pixels and the pixels of the second display panel comprise single-color pixels;

wherein the electrodes in the least one of the two groups of electrodes of the second display panel comprise the signal electrodes; and wherein the driving signals output from the driver integrated circuit are supplied to the signal electrodes of the second display panel in only one color from among the colors of the multi-color pixels of the first display panel.

4. A display device comprising:

a first display panel having pixels formed, in part, of a number of first electrodes;

a second display panel having pixels formed, in part, of second electrodes that are fewer in number than the number of the first electrodes; and a driver integrated circuit that outputs driving signals shared commonly by and supplied to the first and second electrodes;

wherein the pixels of the first display panel comprise multi-color pixels and the pixels of the second display panel comprise single-color pixels; and wherein the driving signals are supplied to the second electrodes in only one color from among the colors of the multi-color pixels of the first display panel.

* * * * *